(12) United States Patent
Robin et al.

(10) Patent No.: US 6,468,932 B1
(45) Date of Patent: *Oct. 22, 2002

(54) $AL_2O_3$-CONTAINING, HIGH-TEMPERATURE RESISTANT GLASS SLIVER WITH HIGHLY TEXTILE CHARACTER, AND PRODUCTS THEREOF

(76) Inventors: Richter Robin, Bägasse 2, 9627 Hilbersdorf (DE); Focke Thomas, Frauensteiner Str. 52, 09599 Freiberg (DE); Lehr Sven, Wohnpark Gentilly 42e, 9599 Freiberg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,560
(22) PCT Filed: May 13, 1998
(86) PCT No.: PCT/EP98/01336
§ 371 (c)(1), (2), (4) Date: Jan. 24, 2000
(87) PCT Pub. No.: WO95/21631
PCT Pub. Date: Nov. 19, 1998

(30) Foreign Application Priority Data

May 13, 1997 (DE) .......................... 197 19 814
Jun. 12, 1997 (DE) .......................... 197 24 874

(51) Int. Cl.[7] .......................... C03C 13/00; C03C 13/06
(52) U.S. Cl. .......................... 501/35; 501/36; 216/97; 428/359; 428/362
(58) Field of Search .......................... 501/35, 36, 54; 216/97; 428/359, 362

(56) References Cited

U.S. PATENT DOCUMENTS

| | | | |
|---|---|---|---|
| 2,491,761 A | 12/1949 | Parker | 41/42 |
| 2,494,259 A | 1/1950 | Nordberg | 106/50 |
| 3,687,850 A | 8/1972 | Gagin | 252/62 |
| 4,046,948 A * | 9/1977 | Zlochower | 501/36 |
| 4,063,001 A * | 12/1977 | Zlochower | 501/36 |
| 4,215,033 A * | 7/1980 | Bowen | 260/42.15 |
| 4,332,600 A * | 6/1982 | Wegerhoff et al. | 65/2 |
| 4,332,601 A * | 6/1982 | Wegerhoff et al. | 65/2 |
| 4,778,499 A * | 10/1988 | Beaver | 65/2 |
| 4,853,001 A * | 8/1989 | Hammel | 55/16 |
| 5,043,045 A * | 8/1991 | Chassagneux et al. | 156/663 |
| 5,567,516 A * | 10/1996 | Achtsnit | 428/357 |
| 5,972,500 A * | 10/1999 | Gross et al. | 428/370 |
| 6,001,437 A * | 12/1999 | Thorpe et al. | 428/34.5 |

FOREIGN PATENT DOCUMENTS

| | | | |
|---|---|---|---|
| DE | 1 596 760 | 4/1971 | .......... C03C/13/00 |
| DE | 29 00 991 A1 | 7/1980 | .......... D01F/9/08 |
| DE | 31 07 600 A1 | 3/1982 | .......... C03C/13/00 |
| DE | 37 25 506 A1 | 2/1989 | .......... C03C/25/02 |
| DE | 37 41 393 A1 | 6/1989 | .......... C04B/35/14 |
| DE | 195 05 618 A1 | 1/1996 | .......... C03B/37/10 |
| DE | 42 40 354 C1 | 2/1997 | .......... C03C/25/00 |
| EP | 0 301 574 A1 | 2/1989 | .......... C03C/25/00 |
| EP | 0 510 653 A1 | 10/1992 | |
| EP | 0 672 024 B1 | 9/1996 | .......... C03C/13/00 |

OTHER PUBLICATIONS

Textile Isolierungs—und Dichtungsmaterialien aus Kieselsaeurestapelfasergarn, Vortrag im Fachausschuss IV der Deutschen Glastechnischen Gesellschaft von Dr. Achsnit Wurzburg, 18. Oct. 1994.

Technische Textilien/Vliesstoffe, 402, Wirkerei–und Stricke–rei–Technik 44 (1994) 5 No month.

Glasfasern, Herausgeber: Institute for Textiltechnik der Rheinisch–Westfalischen Technischen Hochschule Aachen, 1. Ausgabe 1993, Faserstoff–Tabellen nach P.–A. Koch.

Ullmanns Encyklopadie det technischen Chemie, 4. Auflage, Band 21, 1982, Seiten 409 bis 412 No month.

Hans–Dieter Achtsnit, "Thermal insulation and sealing materials manufactured from textile silica sliver", Glass Science and Technology, Glastechnische Berichte, Jun. 1995, Seiten 205 bis 212.

* cited by examiner

Primary Examiner—Karl Group
(74) Attorney, Agent, or Firm—Pendorf & Cutliff

(57) ABSTRACT

The invention relates to $Al_2O_3$-containing and high-temperature resistant glass sliver on silica basis having a highly textile, cotton-like and voluminous character. The invention also relates to glass staple fiber products from said glass sliver and their use. The textile character and high-temperature resistance are obtained in particular by selective acid extraction. The composition of the inventive glass sliver comprises in particular $SiO_2$ as main component and 1–5% (wt.) $Al_2O_3$ as subsidiary component.

30 Claims, No Drawings

AL₂O₃-CONTAINING, HIGH-TEMPERATURE RESISTANT GLASS SLIVER WITH HIGHLY TEXTILE CHARACTER, AND PRODUCTS THEREOF

BACKGROUND OF THE INVENTION

1. Field of the Invention

The present invention relates to an $Al_2O_3$-containing, high-temperature resistant, silica-based glass sliver with highly textile character, products of a like glass sliver, and their use.

2. Description of the Related Art

The production of textile products on an inorganic fiber basis in accordance with various processes has been known for a long time (Ullmanns Enzyklopädie der technischen Chemie, Bd. 11, Verlag Chemie, Weinheim, 1989). For the current manufacture of the like products, $SiO_2$ fibers on the basis of silica or silica glass are being used, with a distinction being made with respect to the single fibers into the primary forms of filament (monofilament, fiber having an unlimited length and a defined fiber cross-section) and staple fiber (fiber having a finite length and a defined fiber cross-section) (Z. Ges. Textilind. 69, 839 (1967), DE patent No. 42 40 354).

In DE patent No. 42 40 354 it was described that a linear textile fiber product—the sliver (staple fiber ribbon)—is a starting material for the production of staple fiber yarns and twisted yarns suited for processing into further follow-up products such as woven or interlaced fabrics. According to this patent specification, a silica sliver has become known which consists of silica staple fibers having a length of 50 to 1000 mm and which is characterised by an individual fiber strength of 20 to 50 cN/tex, a sliver adhesion of 2 to 20 N, and a sliver fineness of 50 to 2000 tex. This textile fiber product is obtained in a three-stage process combining dry spinning of soda water glass filament yarn, formation of soda water glass sliver according to the withdrawal cylinder process, and transformation into silica sliver in an aftertreatment section. It is hence based on a soda water glass solution and exclusively contains $SiO_2$ and $Na_2O$ in various weight proportions. Use of a siliceous sliver produced in such a manner for the production of corresponding staple fiber yarns and twisted yarns, cords, and woven and interlaced fabrics is claimed for application temperatures above 400–500° C. Information on the behavior of such siliceous sliver at temperatures in the vicinity of 1000° C. is, however, not provided. This material is moreover not offered on the market.

Also known for a long time has been the production of glass slivers according to the withdrawal cylinder process (DE examined patent application No. 1 270 748, DE patent No. 1 199 935, DE published patent application No. 195 05 618). In these methods, molten glass emanates from spinning nozzles located at the bottom of a melting end. The elementary glass filaments are subsequently drawn off via a rotating drum, with the filaments being split, by means of an evener and supported by air flow, into glass fibers having non-uniform staple lengths and conveyed into a device arranged in parallel with the drum axis for production of a fiber tape. Strength and close formation of the glass sliver herein are directly dependent on the drawing velocity. Customarily, textile processing aids (e.g. sizing agents) are furthermore added during the process of manufacturing the sliver material. Owing to the components contained in the glass, however, such glass slivers are not suited for applications at temperatures above 300–400° C.

Numerous trials have been undertaken to subject glass fibers to acid treatment in order to enhance their temperature stability, in order to remove glass constituents (boundary-forming substances) and partly remove network modifiers (GB 976 565, EP 236 735, GB 933 821, GB 20 94 363, U.S. Pat. No. 2,718, 461, U.S. Pat. No. 2,491,761, U.S. Pat. No. 4,778,499). In these known processes, acid treatment is carried out on the glass fibers in the sense of individual fibers (filaments), on glass fiber bodies such as mats, felts, loose bulk material etc., wherein the fibers are present randomly (at random orientations), or on particular textile follow-up products such as plain yarns or wovens on the basis of glass fiber filaments. Although it is possible to enhance the thermal strength of the fibers and products thus treated, the mechanical properties (fiber strength, elasticity etc.) thereof are, however, thereby reduced so strongly that processing into various textile follow-up products is not possible. The like materials are thus primarily utilised for manufacturing wovens having high specific gravities (cf. DE patent No. 42 40 354). For this reason it was attempted to ensure textile processing with the aid of additional process steps, by providing the acid-treated glass fibers with particular coatings (EP 236 735), or incorporating further materials such as organic textile fibers (DE-OS 42 21 001). These sophisticated measures to some extent improve the mechanical properties, however not the textile properties of these fiber materials. It has hitherto not been successful to obtain fiber materials having properties typical of cotton. Upon heating these known fibers, moreover, organic constituents are released which are partly hazardous to health. Manufacture of all previously known technical textiles for application temperatures above 400–500° C. cannot be implemented on the basis of these materials as the corresponding voluminous slivers are not available.

For a potential use in the high-temperature range about 1000° C. as textile fiber products, there have previously been furthermore proposed—apart from the named siliceous slivers and silica glass fibers, production of which starts out from a molten quartz material (temperatures in excess of 2,000° C.) and incurs enormous costs—plain yarns on filament basis ($SiO_2$-contents in excess of 90%,). In order to render them more voluminous and bulky, these plain yarns are generally subjected to a sophisticated and costly processing stage, i.e. texturing. The texturing process is contrived such that the capillary glass filaments supplied to a nozzle by means of a feeding installation are intermingled by means of cold air (blast method). By this processing, however, it is equally not possible to obtain the desired bulky and voluminous fiber products having a highly textile character as in the present invention, which have substantially more points in common with a cotton fiber than with a fiber material presenting typical glass properties (fiber brittleness, skin irritation etc.). A possible variety of textile follow-up products obtainable from these textured plain yarns is thus a priori limited. Attempts to produce glass staple fiber yarns having a textured effect, which are disclosed in the prior art (DE-OS 195 05 618), do not constitute an alternative in this context because the utilised C glass sliver must in turn be processed with additional continuous filaments on the one hand and is not suited for use at elevated temperatures (400—approx. 1100° C.) on the other hand.

The inorganic fiber-based materials known in the prior art thus do not satisfy the following criteria:

highly textile fiber properties (cotton character, i.e., bulky, fleecy, voluminous structure, high air retaining capacity, similarity with a cotton flyer roving, pleasant sensation upon skin contact, absence of skin irritation, no brittleness of the fibers)

obtention or improvement of mechanical properties following an acid treatment direct production of a variety of textile follow-up products; no limitation to technical textiles but use in textile industry moreover possible no additional materials or measures (texturing, coating etc.) required for the manufacture of variegated textile follow-up products sufficient thermal strength at continuous temperatures above 400° C.

no release of organic constituents during heating, no health hazards.

SUMMARY OF THE INVENTION

It is the object of the present invention to prepare an $Al_2O_3$-containing, high-temperature resistant glass sliver as a textile, high-performance fiber material which is suited to serve as a starting product for the manufacture of any textile follow-up products known up to the present. This textile high-performance fiber is to combine specific benefits of organic textile fibers or natural fibers with those of inorganic textile fibers in a resulting combination product ("inorganic cotton"). In analogy to a cotton fiber, the highly textile character of the fiber material according to the invention is to be characterised by an open, crimped, curly structure and high voluminosity and bulkiness. In the textile manufacturing process, the novel inorganic fiber allows for further processing like a cotton fiber, however additions of further materials, textile processing aids, binders or the like should not be necessary. The novel glass sliver is to lend itself to direct processing, without requiring any additional process stages (coating measures, texturing steps or the like), into staple fiber yarns, twisted yarns and technical textiles having highly textile properties. During manufacture and use of the glass sliver according to the invention, merely an insignificant proportion of dust is to be incurred. In comparison with the cotton fiber, the $Al_2O_3$-containing glass sliver furthermore is to be characterised by clearly improved mechanical properties and an enormously enhanced thermal resistance. The highly textile fiber material according to the invention is not to contain any organic components, so that no organic constituents whatsoever can be released during heating. The fiber material is to present a high devitrification resistant, be resistant against most chemicals (with the exception of phosphoric acid, hydrofluoric acid as well as strong lyes) and skin compatible, and not present any health hazards.

What is to be produced are $Al_2O_3$-containing glass slivers which, representing a combination of the properties of organic and inorganic textile fiber ("inorganic cotton"), can be processed into any hitherto known textile follow-up products while also being suited for applications at temperatures from 400 to approx. 1100° C.

The glass sliver of the invention, which in particular is a siliceous sliver, presents highly textile properties which become manifest in a cotton-like property and/or an increased voluminosity.

In particular a glass sliver according to the invention is obtained in that a suitable sliver is subjected to acid extraction, bringing about particularly highly textile properties of the resulting $Al_2O_3$-containing, high-temperature resistant glass sliver.

DETAILED DESCRIPTION OF THE INVENTION

In accordance with the invention, starting out from known prescriptions for manufacturing high-temperature resistant glass fibers (GB 976 565, GB 1 121 046), a glass sliver is preferably subjected to an acid extraction. The glass sliver herein, e.g., presents the following composition: 70–75% (wt.) $SiO_2$, 15–25% (wt.) $Na_2O$ and/or $K_2O_3$, as well as 1 to 5% (wt.) $Al_2O_3$, with further components possibly being contained in low weight proportions (up to 5%). Here it was surprisingly found that particularly highly textile properties are generated in the resulting, $Al_2O_3$-containing glass sliver by a suitable combination of sliver/acid treatment, so that a cotton-type, highly textile fiber may be manufactured ("inorganic cotton"). An $Al_2O_3$ content between 1 and 5% (wt.) is preferred with a view to textile character and high fiber strengths. Further possible components in low weight proportions such as CaO, $TiO_2$, MgO, $Fe_2O_3$, $B_2O_3$ or traces of further components do not impair the textile fiber character while they even may additionally improve the mechanical properties.

It was established through trials that particularly advantageous textile properties and high strengths are obtained if a glass sliver including 70–75% (wt.) $SiO_2$, 15–25% (wt.) $Na_2O$ and/or $K_2O$ as well as 1 to 5% (wt.) $Al_2O_3$ is exposed to an acid bath optionally containing 0.1 to 5%, preferably 1 to 2%, of soluble silicone compounds. In all cases it is preferred to use $Na_2O$ as an alkali oxide. In contrast to known treatment processes as disclosed, e.g., by GB patent specification 976 565, the acid treatment must, however, not bring about an impoverishment or even total removal of the $Al_2O_3$ content, as the latter decisively contributes to the textile high-performance character and to the excellent mechanical properties of the glass sliver.

For the acid extraction, inorganic and organic acids may be utilised. If using the inorganic acids sulfuric acid, nitric acid, phosphoric acid, or preferably hydrochloric acid, acid extraction is suitably carried out inside a temperature range from 30 to 90° C., preferably 40 to 60° C., during 2 to 12, preferably 10 to 12 hours, with the acid concentration being 1 to 30%, preferably 15 to 20%, and the quantity ratio of the glass fiber material used to the volume of the acid medium amounting to 1/2.1 to 1/40, preferably 1/4 to 1/15.

If an organic acid such as formic acid, acetic acid or oxalic acid is used, the applied temperature expediently is between 30° C. and the boiling point of the organic acid, preferably between 50 and 90° C., during a period of 2 to 12 hours, preferably 10 to 12 hours. The acid concentration for formic and acetic acid is 1 to 80%, for oxalic acid 1 to 30%, and the quantity ratio of the glass fiber material used to the volume of the acid medium also is 1/2.1 to 1/40.

Subsequent rinsing with water may be carried out at a temperature of 15 to 120° C., preferably 15 to 20° C., optionally under pressure. If using alcohols such as methanol or ethanol and salt solutions as rinsing media, temperatures between 15 and 60° C. are preferred. Subsequent drying is preferably carried out at a temperature of 40 to 150° C., preferably 50 to 130° C. This may optionally be followed by annealing at 300–1000° C.

Both in the acid treatment process and in the rinsing process, stationary or even agitated media may be used. The sliver is suitably used in coil form.

In the drying process, any customary drying methods and apparatus may be used depending on the humidity content of the $Al_2O_3$-containing glass sliver. At times, a pre-drying stage, e.g. by means of centrifuging or pressure separation with the aid of pressurised air, is recommended. Whether the drying method is implemented intermittently or continuously is not of importance for successful drying of the sliver material according to the invention.

In contrast to the previously known prior art for acid-treated glass fibers, the mechanical and textile properties of the acid-extracted, $Al_2O_3$-containing glass slivers are not degraded. owing to the selective acid extraction, obtaining a maximum possible degree of fiber strength is ensured, while partly a surprising increase in strength has even been observed. Textile processing into any known textile follow-up products such as staple fiber yarns, twisted yarns and technical textiles is possible immediately and without any further required materials and measures, while dust pollution is also insignificantly low. Textile processing of the sliver material of the invention can be realised without requiring any addition of textile processing aids, additional materials (glass filaments, stainless steel filaments etc.), binders or the like. Where necessary, however, addition of small amounts of textile auxiliaries (in particular antistatic additives) is possible. Another particular advantage of the "inorganic cotton" according to the invention is that it is completely freed from organic constituents as a result of the acid extraction, so that upon heating up to 1100° C. no organic constituents can be released. Burning off of the textile sizing agent which can be observed with conventional inorganic fiber materials (e.g. glass fiber materials) is thus not observed for the $Al_2O_3$-containing glass slivers of the invention. Owing to the underlying fiber cross-sections (6 to 15 $\mu$m, preferably 7 to 10 $\mu$m), these fiber materials do not have any cancerogenic potential (non-respirable), whereby a health hazard may be excluded.

The present invention thus provides a high-temperature resistant, $Al_2O_3$-containing glass sliver having a highly textile character on silica basis which combines the particular benefits of organic and inorganic textile fibers in an ideal manner. Without any sophisticated and cost-intense processing steps, in particular texturing steps, being required, a sliver material is obtained which has an open, bulky, fleecy structure as also present in the cotton fiber. But even by means of the process of texturing prior art materials it is not possible to obtain comparable, bulked and fleecy textile fiber products capable of storing large amounts of air due to their high bulkiness and voluminosity and thus having excellent insulating behavior. Moreover slivers and cotton flyer rovings according to the invention present clear analogies (optical appearance, pleasant sensation upon skin contact etc.). Typical glass properties (e.g., brittleness of the fibers, causation of skin irritations, or unpleasant sensation upon skin contact, low voluminosity and high intrinsic weight (plain yarns)) were thus eliminated through the acid extraction. Nevertheless the $Al_2O_3$-containing glass sliver of the invention, while obtaining the advantages of the cotton fiber, also presents favorable properties of inorganic textile fibers. Besides the substantially increased fiber strength, the temperature stability of the material is moreover enhanced to such a degree by the acid extraction that it may be employed at temperatures of up to approx. 1100° C. Even at these high temperatures, a considerable residual strength of the sliver is still recorded. In addition it presents a high devitrification resistance: at 1075° C., formation of a-cristobalite is observed only after 24 h. In comparison with the cotton fiber, the novel glass sliver on silica basis is characterised by a clearly lower water absorption (<0.5%, cotton approx. 8%). As a result of free Si-OH groupings, a high absorptivity furthermore exists. This reactive surface thus lends itself for additional ion exchange and modification reactions. Not last, by means of a corresponding selection of the conditions in the acid bath, even a deliberate adjustment of porosity in the $Al_2O_3$-containing glass sliver can be realised (specific surface: 2–20 $m^2$/g, specific pore volume: 10–25 $mm^3$/g, specific pore surface: 5–15 $m^2$/g at fiber cross-sections from 9.5 to 11 $\mu$m).

The glass sliver according to the invention consists of staple fibers having a staple length between 50 and 1000 mm and may be manufactured with finenesses between 100 and 2000 tex. Slivers upward of a fineness of approx. 150 tex may, for example, be used directly as filling filaments for manufacturing woven glass fiber fabric. On conventional doubling and twisting machines it is possible to obtain from this sliver material silica-based glass staple fiber yarns which may, for example, be employed as warp or filler threads in the production of woven or braided glass fiber fabrics, e.g. in woven glass fabrics (having the form of rolled-up products), woven fabric ribbons, glass fiber cords, hoses and packings (round or tetragonal). Due to the analogy with a cotton flyer roving, sliver wound on bobbins is preferably fed directly to a spinning, doubling or twisting machine.

If an additional increase in strength is desired for particular application cases, it is possible to process glass staple fiber yarns, but even the very glass slivers according to the invention, on commercially available twisting machines. If, however, a maximum achievable voluminosity of the glass fiber product is the major interest, the very glass sliver is employed in textile processing. Owing to the cotton-like, voluminous character, it is thus possible to manufacture low-weight, textile follow-up products, so that enormous material savings and thus cost reductions per running meter or surface unit are achieved. This equally applies to the manufacture of knitted or warp-knitted glass fiber fabrics on conventional industrial knitting and sewing machines. As a rule, only an insignificant dust pollution hazard is observed upon processing on textile machines.

The $Al_2O_3$-containing glass slivers may also serve for the production of bonded fiber fabrics. Owing to the cotton-like character of the fiber material, bonded fiber fabrics having low packing densities (specific gravities <90 kg/$m^3$) and high insulation capability are very easily accessible inasmuch as corresponding texturing processes may be omitted. This, too, signals considerable savings of material costs per surface unit (up to approx. 50% in comparison with commercially available bonded fiber fabrics on the basis of textured filament yarns). The $Al_2O_3$-containing glass slivers are supplied to the production line in chopped form. Bonding of the bonded fiber fabrics is preferably carried out through entwisting the staple fibers by means of penetrating needles (needle-punched nonwovens). For particular purposes of use, chemical web bonding, e.g. through the application of adhesives, is also possible. Compact densification of such fibrous nonwovens moreover opens the path for the production of glass fiber panels (boards). Manufacture of corresponding fiber paper, wherein $Al_2O_3$-containing glass staple fibers contained in water are deposited on a water-permeable surface (e.g. perforated cylinder), is possible. This does, however, not constitute a preferred variant.

Owing to their high thermal resistance and their excellent insulation capacity, the $Al_2O_3$-containing glass slivers according to the invention and textile follow-up products produced therefrom are suited especially as heat insulation materials, in particular in furnaces, combustion chambers, boilers, gas conduits, for high-temperature sealing means and high-temperature insulations, as insulation and sound proofing materials in the construction industry, in fire protection, for acoustic and thermal insulation in the automotive industry (e.g. in the engine, in brake linings, in the catalytic converter, for cable coatings, in the exhaust pipe and muffler range), in metal processing and chemical industry (e.g. as a heat shield for aluminum smelteries), for electrical and household appliances, in exhaust gas and filtration technology (e.g. for the exhaust purification of soot and dusts, for hot gas filtration, as high-performance filters), in medical technology (e.g. as a cable protection, cloth-tube filter, prosthetic devices), as accumulator separators and compensators in power plants (e.g. for gas turbines, boiler and waste incineration plants), for the insulation of pipes, pipelines and electrical leads, in shipbuilding, for the production of heat shields in aviation and aerospace engineering as well as a substitute for asbestos and ceramic fiber.

The textile fiber products according to the invention may, however, also be employed with great success as a reinforcing material for synthetic materials (e.g. in boat and ship building, in tank, container and installation construction, for sports gear), for material reinforcement (e.g. by incorporation into a metal matrix, in particular an Al matrix through the intermediary of a melting process), as a lining for textiles and special-purpose textiles, as a carrier for bitumen and for the reinforcement of gypsum, cement, paper (e.g. for fibrous wallpaper) and rubber.

The following examples serve to further explain the present invention.

EXAMPLE 1

550 g of an acid-extracted, $Al_2O_3$-containing glass sliver having a fineness of 430 tex (Sliver 1, extraction with 15% strength hydrochloric acid in the presence of soluble silicone compounds (3%), temperature 55° C., extraction time 10 hours, quantity ratio of utilised fiber material/acid medium 1/2,5) having a composition of 94.2% (wt.) $SiO_2$, 1.1% (wt.) $Na_2O$, 4.6% (wt.) $Al_2O_3$ and further components in traces were spooled across 2 rollers onto a 170 mm long, cylindrical textile yarn tube. The drawing velocity was 120 m/min. Under analogous conditions a C glass-type glass sliver (Sliver 2, fineness also 430 tex, composition of 70.2% (wt.) $SiO_2$, 15.7% (wt.) $Na_2O$, 3.5% (wt.) $Al_2O_3$, 5.0% (wt.) CaO, 3.1% (wt.) MgO, 2.0% (wt.) BaO and further components in traces) was spooled. The previously performed acid treatment under identical conditions merely resulted in a slight modification of the chemical composition (alkali content reduced by 0.3%) and thus not in an enhanced thermal stability. For both slivers (untreated and acid-extracted, respectively) the sliver strengths (100 mm-length portions without twist) as well as the abrasion and the number of filament breakages (rupturing of the fiber tape) during spooling were determined.

Results:

| Sliver 1 (untreated) | Sliver 2 (untreated) |
| --- | --- |
| Sliver strength: 4.52 cN/tex | Sliver strength: 4.11 cN/tex |
| Abrasion during spooling: 0.01% | Abrasion during spooling: 0% |
| Breakages during spooling: 0 | Breakages during spooling: 0 |
| Sliver 1 (acid extraction) | Sliver 2 (acid extraction) |
| Sliver strength: 4.47 cN/tex | Sliver strength: 4.10 cN/tex |
| Abrasion during spooling: 0.01% | Abrasion during spooling: 0.01% |
| Breakages during spooling: 0 | Breakages during spooling: 0 |
| Temperature stability: at least 1020° C. | Temperature stability: 400° C. at maximum |

EXAMPLE 2

An $Al_2O_3$-containing glass sliver (fineness 630 tex, sliver strength 4.55 cN/tex, composition: $SiO_2$ 74.8%, $Na_2O$ 17.5%, $K_2O$ 1.0%, $Al_2O_3$ 2.2%, CaO 1.7%, MgO 1.1%, $B_2O_3$ 0.9%, $TiO_2$ 0.3%, further constituents in traces) was subjected to mineral acid extraction with hydrochloric acid. Herein 50 g of sliver (fiber cross-section 7 µm) were extracted inside a 500-ml PTFE vessel in 300 ml of 20% strength hydrochloric acid in the presence of soluble silicone compounds (1.5%) within 12 hours at a temperature of 55° C. Following a 10-minute draining period, the sliver thus treated was rinsed six times with cold water (temperature 18° C.). Subsequently the extracted and rinsed sliver material was dried for 12 hours at a temperature of 55° C. Afterwards, the highly textile, cotton-type, $Al_2O_3$-containing glass sliver presented the following composition:

| | |
| --- | --- |
| $SiO_2$: | 94.7% (wt.) |
| $Na_2O$: | 0.6% (wt.) |
| $Al_2O_3$: | 2.5% (wt.) |
| CaO: | 0.9% (wt.) |
| MgO: | 0.7% (wt.) |
| $B_2O_3$: | 0.4% (wt.) |
| $TiO_2$: | 0.1% (wt.) |

The sliver material produced in this manner and having a cotton-type, voluminous character presented a continuous temperature stability of up to at least 1000° C. The sliver strength following the acid treatment was 4.42 cN/tex. Following a 24-hour treatment at 900° C., a residual strength of 32% was still obtained. Under these conditions, no formation of α-cristobalite was observed.

EXAMPLE 3

In order to characterise the cotton-like, voluminous character of $Al_2O_3$-containing glass sliver according to the invention, the bulk densities of untreated as well as acid-extracted materials were determined in the uncompacted and compacted conditions (as staple fibers, 5 mm) and relative cell volumes estimated therefrom. Moreover the results of thermal conductivity measurements are indicated which were obtained at room temperature. The experimental results were matched with data experimentally determined on a non high-temperature resistant, C glass-type glass sliver (for composition, see Example 1) under analogous conditions. The parameters of acid extraction and aftertreatment correspond to those of Example 2.

| Material | Bulk density (uncompacted) [kg/m³] | Bulk density (compacted with 20.21 N force) [kg/m³] | Relative pore volume (in relation to untreated glass silver) [%] | Thermal conductivity (25° C., bulk density 50 kg/m³) [W/mK] |
|---|---|---|---|---|
| Glass silver, untreated | 35.5 | 23.0 | 100 | 0.059 |
| $Al_2O_3$-containing glass silver, acid treated | 35.6 | 24.9 | 108 | |
| C glass-type glass silver, untreated | 67.1 | 35.0 | 81 | |
| C glass-type glass silver, acid treated | 48.8 | 29.6 | 94 | 0.061 |

EXAMPLE 4

$Al_2O_3$-containing glass sliver on silica basis (fineness 660 tex, sliver strength 5.35 cN/tex, composition: $SiO_2$ 74.8%, $Na_2O$ 17.5%, $K_2O$ 1.0%, $Al_2O_3$ 2.2%, CaO 1.7%, MgO 1.1%, $B_2O_3$ 0.9%, $TiO_2$ 0.3%, further constituents in traces) having the form of a rotating coil was subjected to a mineral acid extraction with hydrochloric acid. The sliver material (fiber cross-section 7 μm) was extracted inside a 3500-ml PTFE vessel in 3000 ml of 18% strength hydrochloric acid within 10 hours at a temperature of 58° C. Subsequently the extracted textile fiber product was rinsed six times in the same vessel with cold water having a temperature of 20° C. Afterwards the extracted and rinsed glass fiber product was dried for 12 hours at a temperature of 75° C. Subsequently the $Al_2O_3$-containing glass sliver having a cotton-type, voluminous character presented the following composition:

| | |
|---|---|
| $SiO_2$: | 96.1% (wt.) |
| $Na_2O$: | 0.1% (wt.) |
| $Al_2O_3$: | 3.7% (wt.) |

It goes without saying that trace proportions of further components were moreover contained as impurities. The specific loss of mass in comparison with the untreated glass fiber product amounted to 15.1%. The sliver with cotton-type bulkiness produced in this manner presented a continuous temperature stability of up to at least 1050° C. Following the acid treatment, an increase of sliver strength was observed (5.46 cN/tex). Residual strength after 30-hour treatment at 1050° C. was 42%. The sliver material thus produced and treated was subsequently spun on a conventional ring spinning frame (drawing velocity 150 m/min). The abrasion caused in the process was insignificantly low (<0.01%). Filament breakages were not registered during this processing step.

EXAMPLE 5

Glass sliver on silica basis (fineness 420 tex, sliver strength 4.11 cN/tex) located on a 170 mm long, cylindrical textile yarn tube was in this form subjected to mineral acid extraction with formic acid. The sliver (fiber cross-section 9 μm) was extracted in a 3500-ml PTFE vessel in 3100 ml of 30% strength formic acid in the presence of soluble silicones (2%) within 12 hours at a temperature of 60° C. Subsequently the extracted textile fiber product was rinsed by immersion rinsing in a PTFE vessel with cold water (temperature 18° C.). The extracted and rinsed sliver material was dried for 8 hours at a temperature of 115° C. The specific loss of mass in comparison with the untreated sliver amounted to 13.3%, correlating with a specific extraction degree of 96%. Following treatment, the $Al_2O_3$-containing glass sliver with a cotton-type, voluminous character produced in this manner presented the following composition:

| | |
|---|---|
| $SiO_2$: | 94.4% (wt.) |
| $Na_2O$: | 0.9% (wt.) |
| $Al_2O_3$: | 4.3% (wt.) |
| CaO: | 0.2% (wt.) |
| MgO: | 0.1% (wt.) |

Sliver strength after the acid treatment was 3.79 cN/tex. The $Al_2O_3$-containing glass sliver having highly textile properties presented continuous temperature stability up to at least 950° C. Following 24-hour tempering at this temperature, a residual strength of 28% was still registered.

What is claimed is:

1. An $Al_2O_3$-containing, heat stable, silica based glass sliver, obtained by acid extraction of a glass sliver,
   wherein the glass sliver comprises glass staple fibers having different lengths, wherein each glass staple fiber has a length of 50 to 1000 mm; and
   wherein the glass sliver before the acid extraction comprises the following composition:
   70–75% (wt.) $SiO_2$
   15–25% (wt.) $Na_2O$ and/or $K_2O$
   1 to 5% (wt.) $Al_2O_3$ and up to a maximum of 5% (wt.) of further components,
   wherein the glass sliver after the acid extraction is heat stable at temperatures above 400° C.; and
   wherein the glass sliver after the acid extraction comprises:
   95 to 99% (wt.) $SiO_2$
   1 to 5% (wt.) $Al_2O_3$.

2. An $Al_2O_3$-containing, heat resistant glass staple fiber product produced from an $Al_2O_3$-containing, heat stable, silica based glass sliver, obtained by acid extraction of a glass sliver,
   wherein the glass sliver comprises glass staple fibers having different lengths,
   wherein each glass staple fiber has a length of 50 to 1000 mm;
   wherein the glass sliver before the acid extraction comprises the following composition:
   70–75% (wt.) $SiO_2$
   15–25% (wt.) $Na_2O$ and/or $K_2O$
   1 to 5% (wt.) $Al_2O_3$ and up to a maximum of 5% (wt.) of further components,
   wherein the glass sliver after the acid extraction is heat stable at temperatures above 400° C.; and
   wherein the glass sliver after the acid extraction comprises:

95 to 99% (wt.) SiO$_2$
1 to 5% (wt.) Al$_2$O$_3$.

3. An Al$_2$O$_3$-containing, heat stable, silica based glass sliver, obtained by acid extraction of glass slivers with an inorganic or organic acid, optionally in the presence of soluble silicones,
   wherein the sliver comprises glass staple fibers having different lengths;
   wherein each glass staple fiber has a length of 50 to 1000 mm; and
   wherein the glass sliver after the acid extraction contains the following components in the specified mass proportions:
   85 to 99% (wt.) SiO$_2$
   1 to 5% (wt.) Al$_2$O$_3$
   0 to 10% (wt.) Na$_2$O and/or K$_2$O
   0 to 3% (wt.) CaO
   0 to 2% (wt.) MgO
   0 to 2% (wt.) B$_2$O$_3$
   0 to 1% (wt.) TiO$_2$
   0 to 1% (wt.) Fe oxides,
   0 to 1% (wt.) ZrO$_2$
   0 to 0.5% (wt.) BaO
   0 to 0.5% (wt.) PbO
   0 to 0.5% (wt.) ZnO
   0 to 0.5% (wt.) Cr$_2$O$_3$ and
   0 to 0.5% (wt.) F.

4. An Al$_2$O$_3$-containing, heat stable, glass sliver on silica basis as in claim 3, wherein said Fe oxides includes Fe$_2$O$_3$.

5. An Al$_2$O$_3$-containing, heat stable, glass sliver according to claim 3, containing the following components in the specified mass proportions:
   90 to 98% (wt.) SiO$_2$
   2 to 5% (wt.) Al$_2$O$_3$
   0 to 3% (wt.) Na$_2$O and/or K$_2$O
   0 to 1% (wt.) CaO
   0 to 1% (wt.) MgO
   0 to 1% (wt.) Fe oxides, and
   0 to 1% (wt.) TiO$_2$.

6. An Al$_2$O$_3$-containing, heat stable, glass sliver according to claim 3, containing the following components in the specified mass proportions:
   95 to 98% (wt.) SiO$_2$
   2 to 5% (wt.) Al$_2$O$_3$
   0 to 1% (wt.) Na$_2$O and/or K$_2$O based on the total mass of SiO$_2$, Al$_2$O$_3$ and Na$_2$O and/or K$_2$O.

7. An Al$_2$O$_3$-containing, heat resistant, glass sliver according to claim 3, Containing the following components in the specified mass proportions:
   95 to 99% (wt.) SiO$_2$
   1 to 5% (wt.) Al$_2$O$_3$
   0 to 1% (wt.) Na$_2$O and/or K$_2$O
   0 to 3% (wt.) CaO
   0 to 1W (wt.) Fe$_2$O$_3$
   0 to 1% (wt.) TiO$_2$ and
   0 to 1% (wt.) MgO.

8. An Al$_2$O$_3$-containing, heat stable, glass sliver according to claim 3, wherein said sliver after extraction presents a fiber cross-section of 6 to 15 µm.

9. An Al$_2$O$_3$-containing, heat stable, glass sliver according to claim 8, wherein said sliver after extraction presents a fiber cross-section of 7 to 10 µm.

10. An Al$_2$O$_3$-containing, heat stable, silica based glass sliver according to claim 3, wherein the staple fibers present a fineness of 100 to 2000 tex.

11. An Al$_2$O$_3$-containing, heat stable glass sliver according to claim 3, wherein the strength of the sliver is 2 to 30 cN/tex.

12. An Al$_2$O$_3$-containing, heat stable, cotton-like glass sliver according to claim 11, wherein the strength of the sliver is 10 to 30 cN/tex.

13. An Al$_2$O$_3$-containing, heat stable, glass sliver according to claim 3, wherein after said acid extraction, the sliver is rinsed with water, alcohols or salt solutions, dried and optionally annealed.

14. An Al$_2$O$_3$-Containing, heat stable, glass sliver according to claim 3, wherein said inorganic acid is sulphuric acid, nitric acid, phosphoric acid or hydrochloric acid.

15. An Al$_2$O$_3$-containing, heat stable, glass sliver according to claim 3, wherein for said acid extraction the following conditions of acid extraction were applied:
   temperature range: 30–90° C.
   concentration range: 1–30%
   duration of acid extraction: 2–12 hours and weight ratio of the glass sliver to acid: 1/2.1 to 1/40.

16. An Al$_2$O$_3$-containing, heat stable, glass sliver according to claim 3, wherein said acid is an organic acid.

17. An Al$_2$O$_3$-containing, heat stable, glass sliver according to claim 3, wherein said organic acid is formic acid, acetic acid or oxalic acid.

18. An Al$_2$O$_3$-containing, heat stable, glass sliver according to claim 3, wherein said acid is an organic acid and the following conditions of acid extraction were applied:
   temperature range: 30° C. up to the boiling point of the organic acid
   concentration range: 1–80%, for oxalic acid 1 to 30%
   duration of acid extraction: 2–12 hours, and
   weight ratio of the glass sliver to acid: 1/2.1 to 1/40.

19. An Al$_2$O$_3$-containing, heat stable, glass sliver according to claim 13, wherein rinsing was performed with water at a temperature of 15 to 120° C., optionally under pressure, or an alcohol selected from the group consisting of methanol and ethanol, and salt solutions at a temperature of 15 to 60° C.

20. An Al$_2$O$_3$-containing, heat stable, glass sliver according to claim 13, wherein drying was carried out at a temperature of 40 to 250° C., and wherein annealing was optionally performed at a temperature of 250 to 1000° C.

21. An Al$_2$O$_3$-containing, heat stable, voluminous glass staple fiber product produced from an Al$_2$O$_3$-containing, heat stable, voluminous silica based glass sliver obtained by extraction of glass slivers with an inorganic or organic acid, optionally in the presence of soluble silicones containing the following components in the specified mass proportions:

| 85 to 99% (wt.) | SiO$_2$ |
| 1 to 5% (wt.) | Al$_2$O$_3$ |
| 0 to 10% (wt.) | Na$_2$O and/or K$_2$O |
| 0 to 3% (wt.) | CaO |
| 0 to 2% (wt.) | MgO |
| 0 to 2% (wt.) | B$_2$O$_3$ |
| 0 to 1% (wt.) | TiO$_2$ |
| 0 to 1% (wt.) | Fe oxides, |
| 0 to 1% (wt.) | ZrO$_2$ |
| 0 to 0.5% (wt.) | BaO |
| 0 to 0.5% (wt.) | PbO |
| 0 to 0.5% (wt.) | ZnO |
| 0 to 0.5% (wt.) | Cr$_2$O$_3$ and |
| 0 to 0.5% (wt.) | F | wherein the sliver comprises fibers having different lengths; and wherein each glass staple fiber has a length of 50 to 1000 mm.

22. An $Al_2O_3$-containing, heat stable, voluminous glass staple fiber product according to claim 4, therein said fiber product is selected from the group consisting of: glass staple fiber yarns, twisted yarns, technical textiles having the form of woven fabrics, bonded fiber fabrics, cords, ribbons, hoses, packings, glass fiber papers, glass fiber panels, and chopped staple fibers.

23. An $Al_2O_3$-containing, heat stable, glass staple fiber product according to claim 21, wherein said glass staple fiber product is a needle-punched mat.

24. A method for thermal or acoustic insulation, comprising applying to an area to be insulated an $Al_2O_3$-containing, heat stable, glass sliver obtained by acid extraction of a glass sliver;
  wherein the sliver comprises glass staple fibers having different lengths;
  wherein each glass staple fiber has a length of 50 to 1000 mm; and
  wherein the glass sliver contains the following composition:
    70–75% (wt.) $SiO_2$
    15–25% (wt.) $Na_2O$ and/or $K_2O$
    1 to 5% (wt.) $Al_2O_3$ and up to a maximum of 5% (wt.) of further components,
  wherein the glass sliver shows thermal strength at temperatures above 400° C.;
  wherein the glass sliver after the acid extraction comprises:
    95 to 98% (wt.) $SiO_2$
    2 to 5% (wt.) $Al_2O_3$.

25. A method for thermal or acoustic insulation, comprising applying to an area to be insulated an $Al_2O_3$-containing, heat stable, silica based glass sliver comprising the following components in the specified mass proportions:
  85 to 99% (wt.) $SiO_2$
  1 to 5% (wt.) $Al_2O_3$
  0 to 10% (wt.) $Na_2O$ and/or $K_2O$
  0 to 3% (wt.) CaO
  0 to 2% (wt.) MgO
  0 to 2% (wt.) $B_2O_3$
  0 to 1% (wt.) $TiO_2$
  0 to 1% (wt.) Fe oxides,
  0 to 1% (wt.) $ZrO_2$
  0 to 0.5% (wt.) BaO
  0 to 0.5% (wt.) PbO
  0 to 0.5% (wt.) ZnO
  0 to 0.5% (wt.) $Cr_2O_3$ and
  0 to 0.5% (wt.) F.

26. A method as in claim 25, wherein said insulation is applied to furnaces, combustion chambers, boilers, gas conduits, in the construction industry, in fire protection applications, in the automotive industry, in metal processing and chemical industry, for electrical and household appliances, in exhaust gas and filtration technology, in medical technology, as accumulator separators and compensators, for the insulation of pipes, pipelines and electrical leads, in shipbuilding, and for the production of heat shields in aviation and aerospace engineering.

27. A method for reinforcing a matrix material, comprising incorporating into said matrix an $Al_2O_3$-containing, heat stable, silica based glass sliver, obtained by acid extraction of a glass sliver;
  wherein the sliver comprises glass staple fibers having different lengths;
  wherein each glass staple fiber has a length of 50 to 1000 mm; and
  wherein the glass sliver contains the following composition:
    70–75% (wt.) $SiO_2$
    15–25% (wt.) $Na_2O$ and/or $K_2O$
    1 to 5% (wt.) $Al_2O_3$ and up to a maximum of 5% (wt.) of further components
  wherein the glass sliver shows thermal strength at temperatures above 400° C.,
  wherein the glass sliver after the acid extraction comprises:
    95 to 99% (wt.) $SiO_2$
    1 to 5% (wt.) $Al_2O_3$.

28. A method as in claim 27, wherein said matrix is selected from the group consisting of plastics, textiles, bitumen, gypsum, cement, paper and rubber.

29. An $Al_2O_3$-containing, heat stable, glass sliver on silica basis, consisting of the following components in the specified mass proportions:
  85 to 99% (wt.) $SiO_2$
  1 to 5% (wt.) $Al_2O_3$
  0 to 10% (wt.) $Na_2O$ and/or $K_2O$
  0 to 3% (wt.) CaO
  0 to 2% (wt.) MgO
  0 to 2% (wt.) $B_2O_3$
  0 to 1% (wt.) $TiO_2$
  0 to 1% (wt.) Fe oxides,
  0 to 1% (wt.) $ZrO_2$
  0 to 0.5% (wt.) BaO
  0 to 0.5% (wt.) PbO
  0 to 0.5% (wt.) ZnO
  0 to 0.5% (wt.) $Cr_2O_3$ and
  0 to 0.5% (wt.) F.

30. An $Al_2O_3$-containing, heat stable, voluminous silica based glass sliver, obtained by acid extraction of a glass sliver having the following composition:
  70–75% (wt.) $SiO_2$
  15–25% (wt.) $Na_2O$ and/or $K_2O$
  1 to 5% (wt.) $Al_2O_3$ and up to a maximum of 5% (wt.) of further components
  wherein the glass sliver after the acid extraction comprises:
    95 to 99% (wt.) $SiO_2$
    1 to 5% (wt.) $Al_2O_3$
  wherein the glass sliver is heat stable at temperatures above 400° C.; and
  wherein the heat stable glass sliver has a pore volume between 10 and 25 $mm^3/g$.

* * * * *